US009338040B2

(12) United States Patent
Longo et al.

(10) Patent No.: US 9,338,040 B2
(45) Date of Patent: *May 10, 2016

(54) USE OF MULTI-LEVEL MODULATION SIGNALING FOR SHORT REACH DATA COMMUNICATIONS

(71) Applicant: BROADCOM CORPORATION, Irvine, CA (US)

(72) Inventors: Lorenzo Longo, Laguna Beach, CA (US); Vivek Telang, Austin, TX (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/614,829

(22) Filed: Feb. 5, 2015

(65) Prior Publication Data

US 2015/0146766 A1 May 28, 2015

Related U.S. Application Data

(63) Continuation of application No. 13/739,782, filed on Jan. 11, 2013, now Pat. No. 8,964,818.

(60) Provisional application No. 61/732,077, filed on Nov. 30, 2012.

(51) Int. Cl.
*H04L 25/49* (2006.01)
*H04L 27/02* (2006.01)
*H04L 25/03* (2006.01)

(52) U.S. Cl.
CPC ...... *H04L 25/4917* (2013.01); *H04L 25/03885* (2013.01); *H04L 27/02* (2013.01); *H04L 25/03057* (2013.01)

(58) Field of Classification Search
CPC ........ H04B 1/04; H04L 25/497; H04L 25/49; H04L 25/40; H04L 1/246; H04L 1/247; H04L 1/245
USPC ......... 375/219, 233, 340, 232, 242, 268, 286, 375/288, 295, 300, 316, 320, 346
See application file for complete search history.

(56) References Cited

U.S. PATENT DOCUMENTS

| 7,269,212 | B1 * | 9/2007 | Chau ................. H04L 25/03878 326/80 |
| 8,964,818 | B2 * | 2/2015 | Longo ................ H04L 25/4917 375/219 |
| 2005/0089126 | A1 * | 4/2005 | Zerbe .................... H04L 1/0003 375/353 |
| 2008/0101510 | A1 * | 5/2008 | Agazzi ................ H03M 1/0624 375/346 |
| 2014/0075076 | A1 * | 3/2014 | Pillai ...................... G06F 13/14 710/305 |

* cited by examiner

*Primary Examiner* — Siu Lee
(74) *Attorney, Agent, or Firm* — Garlick & Markison; Randy Lacasse

(57) ABSTRACT

A short reach communication system includes a plurality of communication SERDES that communicate data over a short reach channel medium such as a backplane connection (e.g., PCB trace) between, for example, chips located on a common PCB. A multi-level modulated data signal is generated to transmit/receive data over the short reach channel medium. Multi-level modulated data signals, such as four-level PAM, reduce the data signal rate therefore reducing insertion loss, power, complexity of the circuits and required chip real estate.

20 Claims, 9 Drawing Sheets

|  | Power (typ.) | Power (max.) | Area |
|---|---|---|---|
| 2-Level NRZ SERDES | 250 mW | 300 mW | 2.50 mm$^2$ |
| 4-Level PAM SERDES | 108 mW | 130 mW | 1.25 mm$^2$ |

FIG. 9

USE OF MULTI-LEVEL MODULATION SIGNALING FOR SHORT REACH DATA COMMUNICATIONS

CROSS REFERENCE TO RELATED APPLICATIONS

The present U.S. Utility Patent Application claims priority pursuant to 35 U.S.C. §120 as a continuation of U.S. Utility application Ser. No. 13/739,782, entitled "Use of Multi-Level Modulation Signaling for Short Reach Data Communications," filed Jan. 11, 2013, issuing as U.S. Pat. No. 8,964,818 on Feb. 24, 2015, which claims priority pursuant to 35 U.S.C. §119(e) to U.S. Provisional Application No. 61/732,077 entitled "Use of Multi-Level Modulation Signaling for Short Reach Data Communications," filed Nov. 30, 2012, both of which are hereby incorporated herein by reference in their entirety and made part of the present U.S. Utility Patent Application for all purposes.

BACKGROUND OF THE INVENTION

1. Technical Field of the Invention

This invention relates generally to communications and more particularly to circuits used to support short reach communications.

2. Description of Related Art

Communication systems are known to support wireline and wireless communications between various devices. Such communication systems include, for example, backplane, chip-to-chip, copper wire (e.g., trace), fiber optic communications, national and/or international cellular telephone systems, satellite, cable television, the Internet, point-to-point in-home wireless networks and radio frequency identification (RFID) systems. Each type of communication system is constructed, and hence operates, in accordance with one or more communication standards. For instance, short reach communication systems may operate in accordance with one or more standards including, but not limited to, IEEE 802.3##. Wireless communication systems may operate in accordance with one or more standards including, but not limited to, 3GPP, LTE, LTE Advanced, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

The following IEEE standards/draft standards are hereby incorporated herein by reference in their entirety and are made part of the present U.S. Utility Patent Application for all purposes:

1. IEEE Stds 802.3##™ (generically), "IEEE Standard for Information technology—IEEE 802.3 is a working group and a collection of IEEE standards produced by the working group defining the physical layer and data link layer's media access control (MAC) of wired Ethernet. This is generally a local area network technology with some wide area network applications. Physical connections are made between nodes and/or infrastructure devices (hubs, switches, routers) by various types of copper or fiber cable. 802.3 is a technology that supports the IEEE 802.1 network architecture. 802.3 also defines LAN access method used using CSMA/CD.
2. IEEE Std 802.3bj™, "IEEE Standard for Information technology—IEEE 802.3bj defines a 4-lane 100 Gb/sec backplane PHY for operation over links consistent with copper traces on "improved fire retardant (FR-4)" (as defined by IEEE P802.3ap or better materials to be defined by the Task Force) with lengths up to at least 1 m and a 4-lane 100 Gb/sec PHY for operation over links consistent with copper twin-axial cables with lengths up to at least 5 m.
3. IEEE Std 802.3ba™, "IEEE Standard for Information technology—IEEE 802.3ba defines a 40 Gbit/s and 100 Gbit/s Ethernet. 40 Gbit/s over 1 m backplane, 10 m Cu cable assembly (4×25 Gbit or 10×10 Gbit lanes) and 100 m of MMF and 100 Gbit/s up to 10 m of Cu cable assembly, 100 m of MMF or 40 km of SMF respectively.
4. IEEE Std 802.3bm™, "IEEE Standard for Information technology—IEEE Standard for Information technology—Telecommunications and information exchange between systems—Local and metropolitan area networks—Specific requirements Part 3: Carrier Sense Multiple Access with Collision Detection (CSMA/CD) Access Method and Physical Layer Specifications Amendment: Physical Layer Specifications and Management Parameters for 40 Gb/s and 100 Gb/s Operation Over Fiber Optic Cables.

Currently, wireline and wireless communications occur within licensed or unlicensed frequency spectrums. For example, wireline systems, such as those using fiber optics as a transfer medium, operate in the GHz frequency spectrum (e.g., 25 GHz-100 GHz).

Channel loss at high data speeds (e.g., Gigabit/sec (Gb/sec) range, plus) may be influenced by decisions made around power and chip area costs. One area for consideration, input/output (I/O), uses high speed SERDES circuitry. A serializer/deserializer (SERDES) converts data between serial data and parallel interfaces in each direction. The term "SERDES" generically refers to interfaces used in various technologies and applications. The basic SERDES function is made up of two functional blocks: a Parallel In, Serial Out (PISO) block (aka Parallel-to-Serial converter) and a Serial In, Parallel Out (SIPO) block (aka Serial-to-Parallel converter).

The PISO (Parallel Input, Serial Output) block typically has a parallel clock input, a set of data input lines, and input data latches. It may use an internal or external Phase-locked loop (PLL) to multiply the incoming parallel clock up to the serial frequency. The simplest form of the PISO has a single shift register that receives the parallel data once per parallel clock, and shifts it out at the higher serial clock rate. Implementations may also have a double-buffered register.

The SIPO (Serial Input, Parallel Output) block typically has a receive clock output, a set of data output lines and output data latches. The receive clock may have been recovered from the data by the serial clock recovery technique. However, SERDES which do not transmit a clock use reference clock to lock the PLL to the correct Tx frequency, avoiding low harmonic frequencies present in the data stream. The SIPO block then divides the incoming clock down to the parallel rate. Implementations typically have two registers connected as a double buffer. One register is used to clock in the serial stream, and the other is used to hold the data for the slower, parallel side. Such serializer encoder and deserializer decoder blocks are generally defined in the Gigabit Ethernet specification.

Conventional high-speed SERDES I/O use 2-level non-return-to-zero (NRZ) signaling. As data rates increase to 25 Gb/sec and beyond, the power and area costs of these SERDES increase hyper-linearly with the rate. For example, a 25 Gb/sec NRZ SERDES consumes 3.5× the power of a 10 Gb/SEC NRZ SERDES.

Disadvantages of conventional approaches will be evident to one skilled in the art when presented in the disclosure that follows.

BRIEF SUMMARY OF THE INVENTION

The technology described herein is directed to an apparatus and methods of operation that are further described in the following Brief Description of the Drawings and the Detailed Description of the Invention. Other features and advantages will become apparent from the following detailed description made with reference to the accompanying drawings.

BRIEF DESCRIPTION OF THE SEVERAL VIEWS OF THE DRAWING(S)

FIG. 9 illustrates a table comparing short reach 2-level NRZ power and chip areas versus the described short reach four-level embodiments in accordance with the technology described herein.

DETAILED DESCRIPTION OF THE INVENTION

Figure 1:
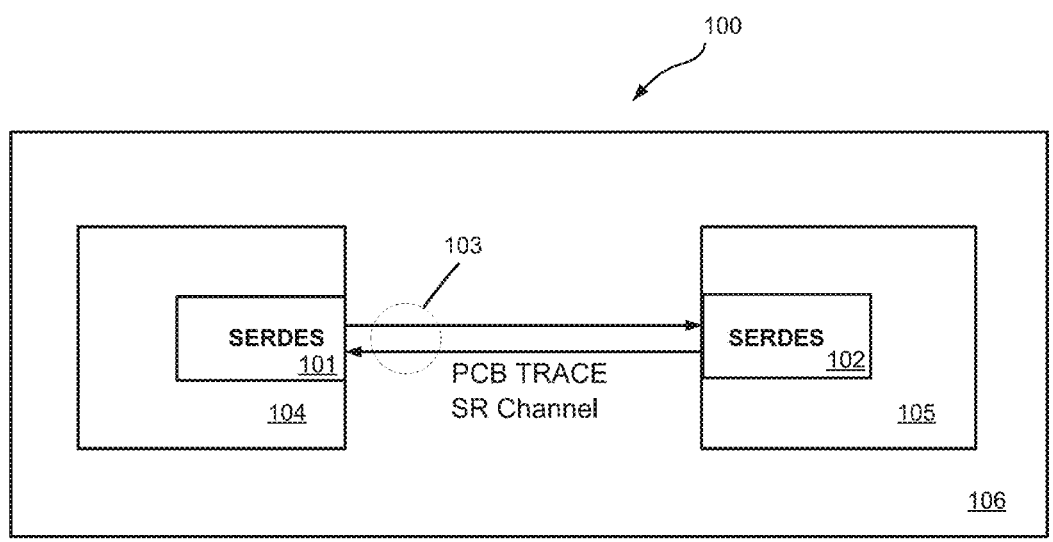
FIG. 1 is a schematic block diagram of a communication system in accordance with the technology described herein.

FIG. 1 is a schematic block diagram of a communication system 100 in accordance with the technology described herein. In particular, communication system 100 includes a plurality of communication SERDES 101 and 102 that communicate data over a backplane connection 103 such as a PCB trace between, for example, chips 104 and 105 located on a common PCB 106.

In embodiments of the present invention, the backplane connection 103 can be a connection such as a PCB trace that operates in accordance with one or more standard protocols, such as IEEE Std 802.3bj or other wireline, cable, fiber, other serial or parallel advanced technology attachment (SATA or PATA), or other wired communication protocol, either standard or proprietary. Further, the communication path can include separate transmit and receive paths that use separate carrier frequencies and/or separate frequency channels. Alternatively, a single frequency or frequency channel can be used to bi-directionally communicate data between chips 104 and 105.

Figure 2:
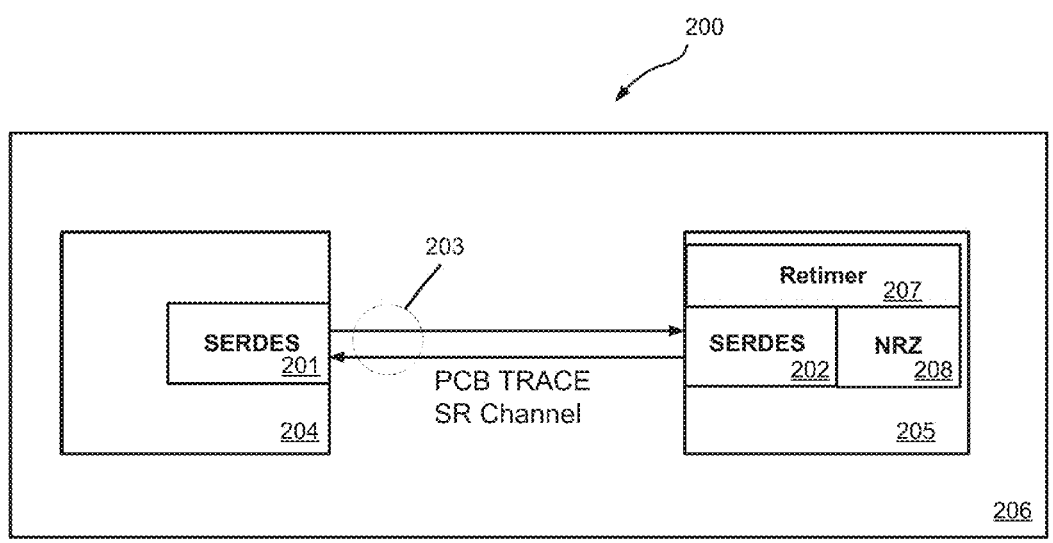
FIG. 2 is a schematic block diagram of a communication system connected to optical modules in accordance with the technology described herein.

FIG. 2 is a schematic block diagram of communication system 200 in accordance with the technology described herein. In particular, communication system 200 includes a plurality of communication SERDES 201 and 202 that communicate data over a backplane connection 203 such as a PCB trace between, for example, chip 204 and optical module 205 located on a front panel (not shown) or located on a common PCB 206. In this embodiment, data signals from chip 204 are converted to optical signals by optical module 205. Retimer 207 is used to provide clocking and jitter reset to reduce equalization requirements in the module. Non-return-to-zero (NRZ) 208 includes a method of mapping a binary signal to a physical signal for transmission over a transmission media. The two level NRZ data signal has a transition at a clock boundary if the bit being transmitted is a logical 1, and does not have a transition if the bit being transmitted is a logical 0.

In an embodiment of the present invention, each of the SERDES noted in FIG. 1 and FIG. 2 includes a transceiver including one or more features or functions of the technology described herein to enable one-way, two-way, independent or simultaneous communications. Such transceivers shall be described in greater detail in association with FIGS. 3-9 that follow.

Figure 3:
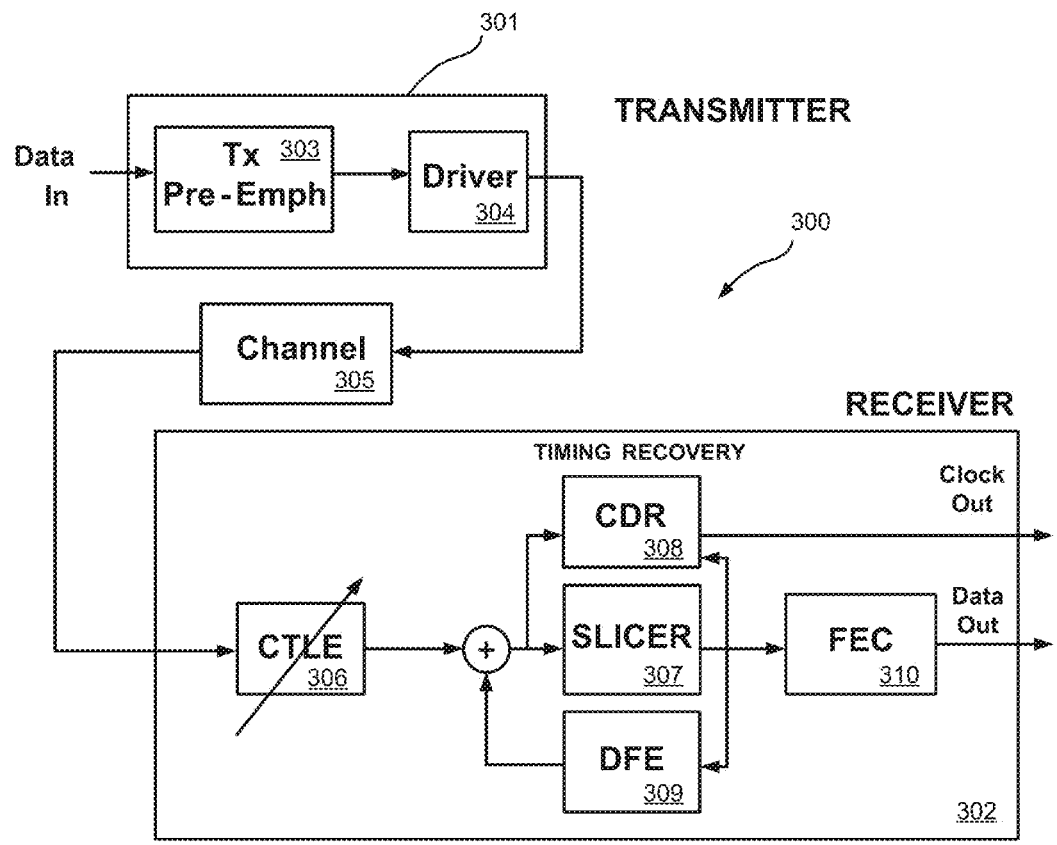
FIG. 3 is a schematic block diagram of a two-level NRZ SERDES communication system in accordance with the technology described herein.

FIG. 3 is a schematic block diagram of a two-level NRZ SERDES communication system 300 illustrating a transmitter component 301 of a first SERDES transceiver (e.g., 101) and a receiver component 302 of a second SERDES transceiver (e.g., 102). Each SERDES transceiver includes both a transmitter and receiver component for bi-directional and simultaneous communication between chips or other components using a PCB trace, wire line, cable or fiber channel. However, embodiments including only a single direction transmitter and receiver are not outside the scope of the technology described herein.

Referring to FIG. 3, transmitter 301 includes, but is not limited to, a transmitter including pre-emphasizer 303 and driver 304. Pre-emphasizer 303 corrects for anticipated adverse channel characteristics (e.g., frequency dependent attenuation and phase distortion). Pre-emphasis refers to a system process designed to increase (within a frequency band) the magnitude of some (usually higher) frequencies with respect to the magnitude of other (usually lower) frequencies in order to improve the overall signal-to-noise ratio by minimizing the adverse effects of such phenomena as attenuation distortion or phase distortion in subsequent parts of the system. Driver 304 amplifies and outputs the two-level NRZ data signal to be transmitted across channel 305. As previously stated, the channel is a short reach medium (e.g., with insertion loss of 15 dB or less at 15 GHz) and can be any or a combination of a PCB trace, wire line, cable or fiber. While transmitter 301 shows only a pre-emphasizer and driver, the transmitter additionally can include common and well known SERDES transmitter components, such as but not limited to: buffers, encoders/decoders, converters, filters, mixers, frequency converters, oscillators, processing modules, clocking circuitry (e.g., phase-locked loop (PLL)) and various amplification stages.

Referring to FIG. 3, the transmitted two-level NRZ data signal traverses channel 305 and is received by receiver 302. Receiver 302 includes, but is not limited to, a continuous time linear equalizer (CTLE) 306. CTLE 306 boosts high frequencies attenuated during transmission across the channel. CTLE 306 is constantly optimizing amplification to optimize performance by compensating for distortion due to temperature, voltage or humidity variations. Slicer 307 slices the output data signals from CTLE 306 into two levels (0, 1). Clock and Data Recovery (CDR) 308 optimizes the phase and instantaneous sampling (e.g., moving the clock edge left or right for optimized timing). Decision Feedback Equalizer (DFE) 309 is a filter that uses feedback of detected symbols in addition to conventional equalization of future symbols. In some embodiments, some systems use predefined training sequences to provide reference points for the adaptation process. The DFE automatically adapts to time-varying properties of the communication channel 305. It is frequently used with coherent modulations such as phase shift keying, mitigating the effects of multipath propagation and Doppler spreading. Forward Error Correction (FEC) 310 provides correction of the output data. In one embodiment, the transmitter encodes the data using an error-correcting code (ECC) prior to transmission. The additional information (redundancy) added by the code is used by the receiver to recover the original data. In general, the reconstructed data is what is deemed the "most likely" original data.

While receiver 302 shows only CTLE 306, Slicer 307, CDR 308, DFE 309 and FEC 310, the receiver additionally can include common and well known SERDES receiver components, such as but not limited to: buffers, encoders/decoders, converters, filters, mixers, frequency converters, oscillators, processing modules, clocking circuitry (e.g., phase-locked loop (PLL)) and various amplification stages.

Figure 4:
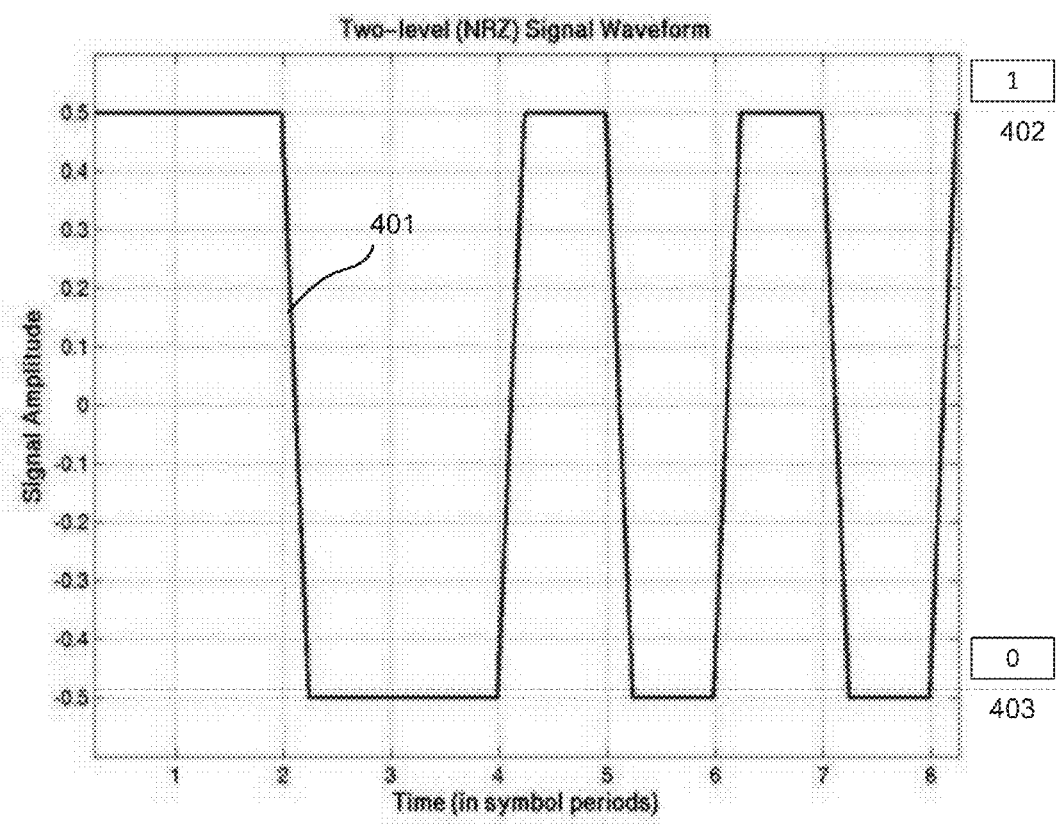
FIG. 4 is a graph of a two-level NRZ signal waveform in accordance with the technology described herein.

SERDES transceiver elements shown in FIG. 3 support a two-level NRZ data signal as further illustrated in FIG. 4. NRZ (non-return-to-zero) refers to a form of digital data transmission in which the binary low and high states, represented by numerals 0 and 1, are transmitted by specific and constant DC (direct-current) voltages. As shown in FIG. 4, the two-level NRZ data signal 401 represents a "1" at level 402 and a "0" at level 403. As data rates increase to 25 Gb/sec and beyond, the power and area costs of these two-level NRZ SERDES increases hyper-linearly with the rate. For example, a 25 Gb/sec NRZ SERDES consumes 3.5× the power of a 10 Gb/sec NRZ SERDES.

Figure 5:
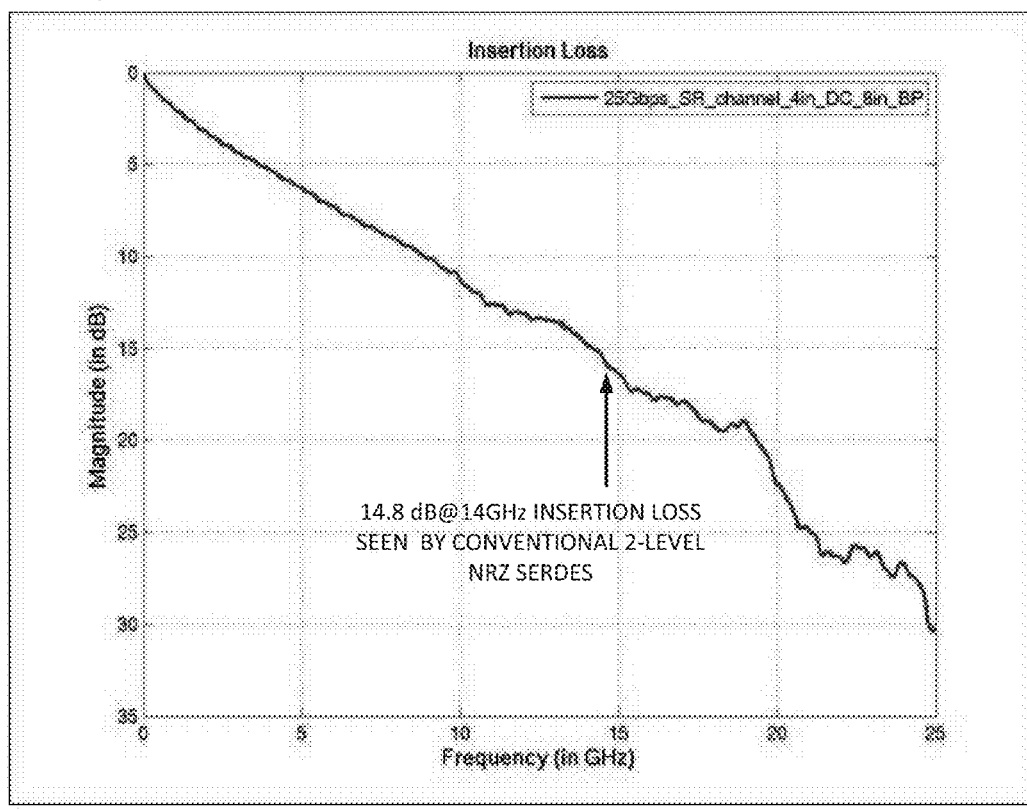
FIG. 5 is a graph of insertion loss, in dB, of a short reach channel across PCB as it applies to a two-level NRZ 25 Gb/sec data signal SERDES in accordance with the technology described herein.

FIG. 5 graphs insertion loss, in dB, of a short reach channel across PCB (FR4) as it applies to a two-level NRZ 25 Gb/sec data signal SERDES. Insertion loss is the loss of signal power resulting from the insertion of a transmission line or optical fiber between two communication devices, and is usually expressed in decibels (dB). As shown, insertion loss for a short reach channel across PCB (FR4) as it applies to a two-level NRZ 25 Gb/sec data signal SERDES is 14.8 dB at 14 GHz and extends to approximately 30 dB at 25 GHz. Insertion losses at these levels are high and require complex circuitry to compensate, wasting significant power.

Implementing multi-level modulation signaling for short reach high-speed communications provides many advantages over the short reach two-level NRZ SERDES solution. Further details including functions and features of a multi-level SERDES are discussed in conjunction with FIGS. 6-9 that follow.

Conventional high-speed SERDES used in communications applications must be highly stable. The SERDES technology disclosed herein is used in various embodiments to provide a stable (e.g., reduced channel loss), low area (i.e., silicon real estate) and low power solution. Multi-level modulation encodes multiple bits per symbol. This allows the signaling rate to be lower than the signaling rate needed for two-level NRZ signaling. For example, a 25 G PAM-4 (4-level pulse amplitude modulation (PAM)) SERDES uses a signaling rate of 12.5 GBaud/sec compared to a 25 G NRZ SERDES which uses a signaling rate of 25 GBaud/sec.

Figure 6:
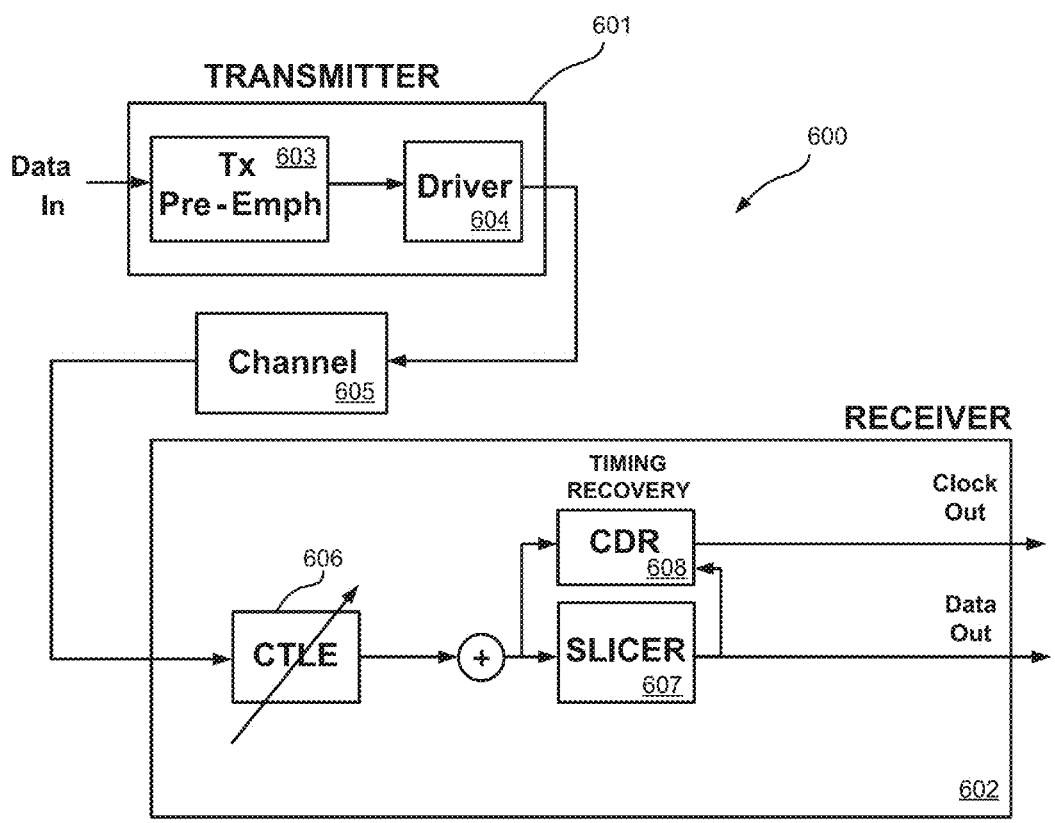
FIG. 6 illustrates a schematic block diagram of a four-level SERDES communication system in accordance with the technology described herein.

FIG. 6 is a schematic block diagram of a four-level SERDES communication system 600 illustrating a transmitter component 601 of a first SERDES transceiver (e.g., 101) and a receiver component 602 of a second SERDES transceiver (e.g., 102). Each SERDES transceiver includes both a transmitter and receiver component for bi-directional and simultaneous communications between chips or other components using a PCB trace, wire line, cable or fiber channel. However, embodiments including only a single direction transmitter to receiver are not outside the scope of the technology described herein.

Referring to FIG. 6, transmitter 601 includes, but is not limited to, a transmitter including pre-emphasizer 603 and driver 604. Pre-emphasizer 603 corrects for anticipated adverse channel characteristics (e.g., distortion due to temperature or humidity variations). Pre-emphasis refers to a system process designed to increase (within a frequency band) the magnitude of some (usually higher) frequencies with respect to the magnitude of other (usually lower) frequencies in order to improve the overall signal-to-noise ratio by minimizing the adverse effects of such phenomena as attenuation distortion or phase distortion in subsequent parts of the system. Driver 604 amplifies and outputs the four-level PAM data signal to be transmitted across channel 605. As previously stated, the channel is a short reach medium (e.g., with insertion loss of 10 dB or less at 7 GHz) and can be any or a combination of a PCB trace, wire line, cable or fiber. While transmitter 601 shows only a pre-emphasizer and driver, the transmitter additionally can include common and well known SERDES transmitter components, such as but not limited to: buffers, encoders/decoders, converters, filters, mixers, frequency converters, oscillators, processing modules, clocking circuitry (e.g., phase-locked loop (PLL)) and various amplification stages.

Referring to FIG. 6, the transmitted four-level PAM data signal traverses channel 605 and is received by receiver 602. Receiver 602 includes, but is not limited to, a continuous time linear equalizer (CTLE) 606. CTLE 606 boosts high frequencies attenuated during transmission across the channel. CTLE 606 is constantly optimizing amplification to optimize performance. Slicer 607 slices the output data signals from CTLE 606 into four levels. Clock and Data Recovery (CDR) 608 optimizes the phase and instantaneous sampling (e.g., moving the clock edge left or right for optimized timing). In one multi-level embodiment, the Decision Feedback Equalizer (DFE) and Forward Error Correction (FEC) elements are not needed, thus reducing the complexity of the receiver circuit and removing elements which take up valuable PCB real estate.

While receiver 602 shows only CTLE 606, Slicer 607 and CDR 608, the receiver additionally can include common and well known receiver components, such as but not limited to: buffers, encoders/decoders, converters, filters, mixers, frequency converters, oscillators, processing modules, clocking circuitry (e.g., phase-locked loop (PLL)) and various amplification stages.

Figure 7:
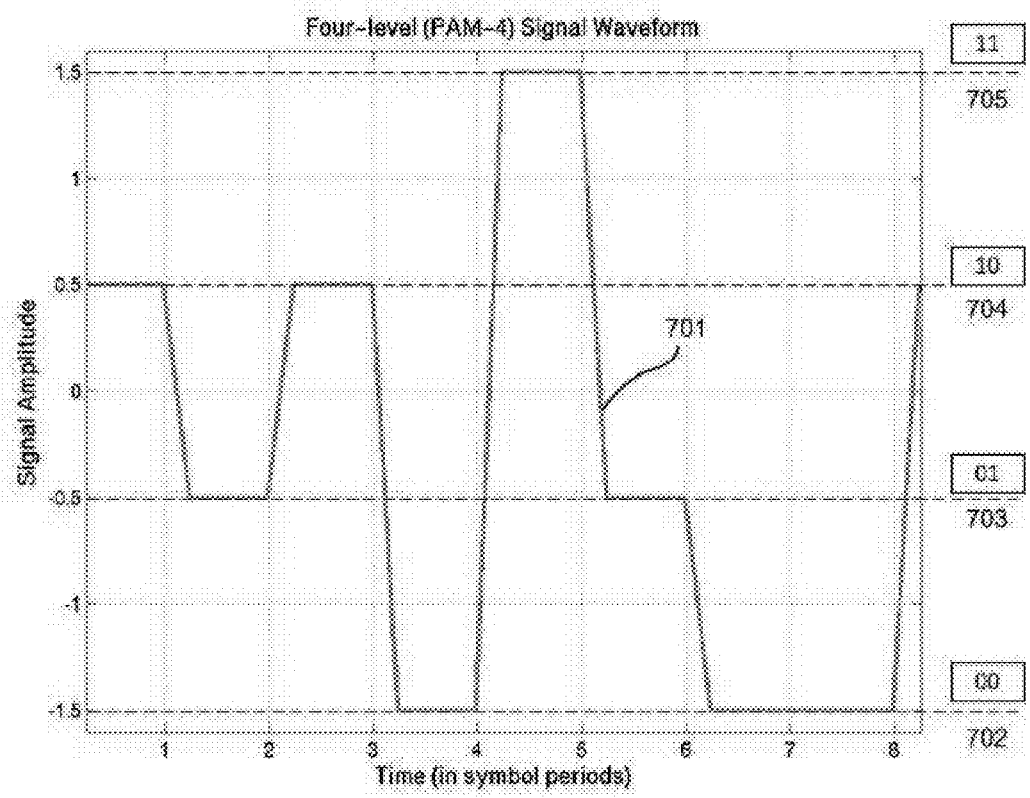
FIG. 7 is a graph of a four-level PAM signal waveform in accordance with the technology described herein.

While NRZ (non-return-to-zero) data signals are represented by numerals 0 and 1, the present embodiment multi-level data signal is implemented, in one embodiment, by a four-level scheme. As shown in FIG. 7, the four-level data signal 701 represents a "00" at level 702, "01" at level 703, "10" at level 704 and "11" at level 705. Referring back to FIG. 2, a four-level signal would be transmitted from SERDES 201 to SERDES 202 and then converted to a two-level NRZ signal. As previously discussed, when data rates increase to 25 Gb/sec and beyond, the power and area costs of two-level NRZ SERDES increase hyper-linearly with the rate. The multi-level (four) embodiment implements a slower signal rate to send the same data and therefore significantly reduces power requirements.

Figure 8:
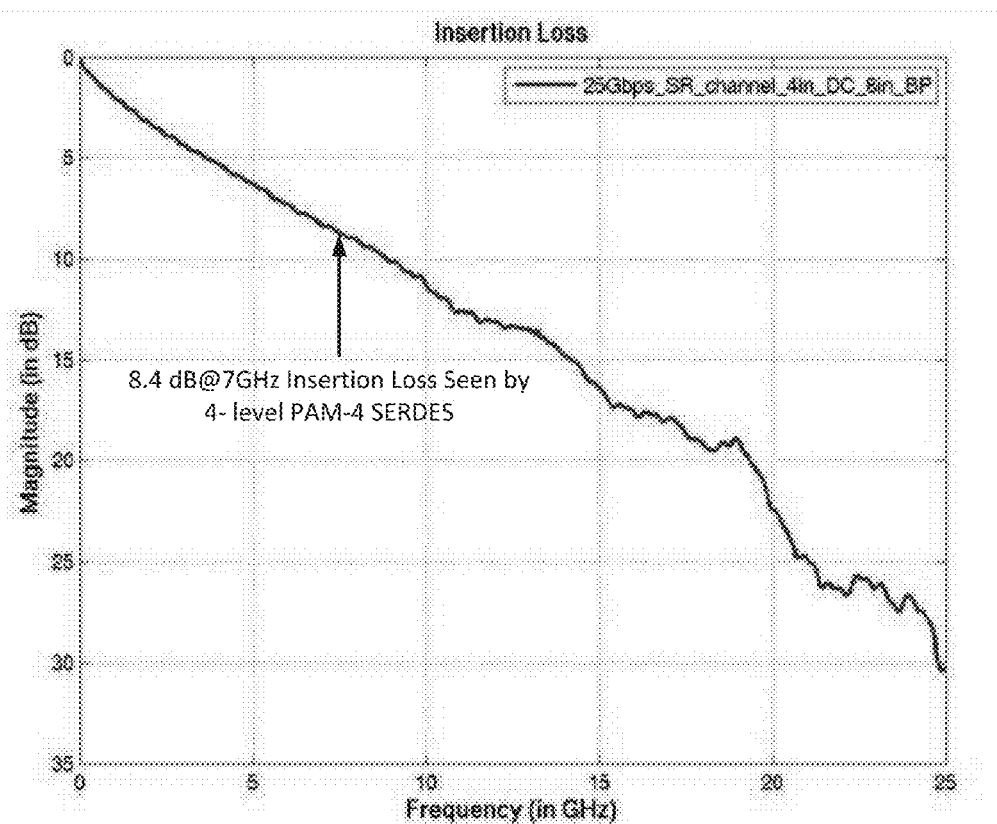
FIG. 8 is a graph of insertion loss, in dB, of a short reach channel across PCB as it applies to four-level 25 Gb/sec data signal SERDES in accordance with the technology described herein.

FIG. 8 graphs insertion loss, in dB, of a short reach channel across PCB (FR4) as it applies to a two-level NRZ 25 Gb/sec data signal SERDES. Insertion loss is the loss of signal power resulting from the insertion of a transmission line or optical fiber between two communication devices, and is usually expressed in decibels (dB). As previously shown, insertion loss for a short reach channel across PCB (FR4) as it applies to a two-level NRZ 25 Gb/sec data signal SERDES is 14.8 dB at 14 GHz and extends to approximately 30 dB at 25 GHz. However, as the data rate is reduced in half by a four-level system, the same channel has insertion loss of only 8.4 dB at 7 GHz, for a four-level data signal. Overall, the benefit of lowering the signaling rate far outweighs any potential cost of implementing a multi-level transmitter and receiver, as opposed to a 2-level transmitter and receiver. While a four-level embodiment is described herein, additional levels (e.g., 8, 16, 32, 64, 128, etc.) can be added without departing from the scope of the technology described and claimed herein.

In one example embodiment, the SERDES described herein operates within transceiver circuits as part of, for example, short reach embodiments (e.g., backplane). However, an example embodiment encompasses the multi-level SERDES solutions as part of a 100 Gb/sec (25 Gb/sec×4) repeater for 100 Gb/sec front-panel and backplane applications.

The various embodiments enjoy certain advantages, such as, but not limited to: The channel loss is significantly lower at the lower signaling rate. For example the channel loss for 12.5 GBaud signaling is less than half of the channel loss for 25 GBaud signaling. The analog implementation of a lower signaling rate SERDES is significantly simpler and consumes significantly lower area and power. The digital power of the SERDES which is proportional to the data rate is also significantly lower for a SERDES that uses a lower signaling rate.

FIG. 9 illustrates a comparison of short reach 2-level NRZ power and chip areas versus the described short reach four-level PAM embodiments. As shown, power levels are reduced to less than half. Chip area is reduced in half by simplification of receiver architecture. By reducing attenuation across the channel (based on data rate) a receiver of lower complexity is needed to recover data signals.

Additional embodiments include, but are not limited to, connecting switch and controller chips to external PHYs, retimers, inverse gearbox chips and/or front-panel fiber optic modules.

In an embodiment of the technology described herein, SERDES elements, transmitter 601 and receiver 602 can be implemented via use of a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip. Such a memory device may be a read-only memory, random access memory, volatile memory, non-volatile memory, static memory, dynamic memory, flash memory, and/or any device that stores digital information. Note that when the processing devices implement one or more of their functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

While the transmitter and receiver are shown separately, it should be understood that these elements could be implemented separately, together through the operation of one or more shared processing elements/devices or in combination of separate and shared elements/processing.

Throughout the specification, drawings and claims various terminology is used to describe the various embodiments. As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The technology as described herein has been described above with the aid of blocks illustrating the performance of specified functions and relationships thereof. The boundaries and sequence of these functional building blocks have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. One of average skill in the art will also recognize that the functional building blocks, and other illustrative blocks, modules and components herein, can be implemented as illustrated or by discrete components, application specific integrated circuits, processors executing appropriate software and the like or any combination thereof.

The technology as described herein may have also been described, at least in part, in terms of one or more embodiments. An embodiment of the technology as described herein is used herein to illustrate an aspect thereof, a feature thereof, a concept thereof, and/or an example thereof. A physical embodiment of an apparatus, an article of manufacture, a machine, and/or of a process that embodies the technology described herein may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

While particular combinations of various functions and features of the technology as described herein have been expressly described herein, other combinations of these features and functions are likewise possible. The technology as described herein is not limited by the particular examples disclosed herein and expressly incorporates these other combinations.

What is claimed is:

1. A high speed communication system comprising:
   a short reach communication channel;
   a first high speed serializer/deserializer (SERDES) including a transceiver configured to be operative at a first end of the short reach communication channel;
   a first converter configured within the first high speed SERDES to convert from two-level non-return-to-zero (NRZ) data signals to multi-level(n) pulse amplitude modulated (PAM) data signals, where n>2;
   the first high speed SERDES transmitting the multi-level (n) PAM data signals over the short reach communication channel through a communications channel medium;
   a second high speed SERDES including a transceiver configured to be operative at a second end of the short reach communication channel;
   a second converter configured within the second high speed SERDES to convert received multi-level(n) PAM data signals to two-level NRZ data signals; and
   wherein transmitting multi-level(n) PAM data signals reduce a data signaling rate of the high speed communication system.

2. The high speed communication system of claim 1, wherein the first high speed SERDES and the second high speed SERDES bi-directionally convert signals from the two-level NRZ data signals to the multi-level(n) PAM data signals for transmission and the multi-level(n) PAM data signals to the two-level NRZ data signals upon reception.

3. The high speed communication system of claim 1, wherein the transceiver comprises at least an optical converter and the short reach communication channel comprises one or more optical fibers.

4. The high speed communication system of claim 1, wherein the transceiver comprises at least a receiver, the receiver comprising a continuous time linear equalizer (CTLE), slicer and clock and data recovery circuit (CDR).

5. The high speed communication system of claim 4, wherein the CTLE boosts high frequencies attenuated during data transmission across the communications channel medium to optimize performance, the slicer slices data signals output from the CTLE into at least four levels (where n≥4) and the CDR optimizes phase and instantaneous sampling.

6. The high speed communication system of claim 1, wherein the high speed communication system is operative with the communications channel medium comprising any of, or a combination of: short trace printed circuit board (PCB), backplane, copper wire, wireline or optical fiber.

7. The high speed communication system of claim 1, wherein the high speed communication system is operative in at least a 100 Gb/sec (25 Gb/sec×4) repeater used in 100 Gb/sec or greater front-panel and backplane applications.

8. The high speed communication system of claim 1, wherein transmitting using the multi-level (n) PAM data signals reduces power by at least 50% over two-level NRZ data signaling.

9. The high speed communication system of claim 1, wherein transmitting using the multi-level(n) PAM data signals reduces SERDES chip area by at least 50% over two-level NRZ data signaling.

10. A high speed communication system comprising:
    a plurality of high speed serializer/deserializer (SERDES) circuits;
    a short reach communications channel medium interconnecting the plurality of high speed SERDES circuits;
    a transceiver operable with each of the plurality of high speed SERDES circuits to transmit/receive at least n-level modulated data signals, where n>2, over the short reach communications channel medium;

wherein the transceiver comprises at least a receiver, the receiver comprising a continuous time linear equalizer (CTLE), slicer and clock and data recovery circuit (CDR), wherein the CTLE boosts high frequencies attenuated during transmission across the short reach communications channel medium to optimize performance, the slicer slices data signals output from the CTLE into the at least n-levels and the CDR optimizes phase and instantaneous sampling; and wherein the plurality of high speed SERDES circuits each bi-directionally convert signals from two-level non-return-to-zero (NRZ) data signals to the at least n-level modulated data signals for transmission and the at least n-level modulated data signals to two-level NRZ data signals upon reception.

11. The high speed communication system of claim 10, wherein n≥4 and transmission or receiving using at least four-level modulated data signals reduces a data signaling rate of the high speed communication system.

12. The high speed communication system of claim 10 further comprising the transceiver including at least an optical converter and the short reach communication channel including one or more optical fibers.

13. The high speed communication system of claim 10, wherein the high speed communication system is operative with the short reach communications channel medium comprising any of, or a combination of: short trace printed circuit board (PCB), backplane, copper wire, wireline or optical fiber.

14. The high speed communication system of claim 10, wherein the high speed communication system is operative in at least a 100 Gb/sec (25 Gb/sec×4) repeater used in 100 Gb/sec or greater front-panel and backplane applications.

15. The high speed communication system of claim 10, wherein transmission using at least eight-level modulated data signals (n≥8) reduces power by at least 50% over using two-level modulated data signaling.

16. The high speed communication system of claim 15, wherein transmission using the at least eight-level modulated data signal reduces SERDES chip area by at least 50% over using two-level modulated data signaling.

17. A method of communication within a short reach communications channel, the method comprising:

receiving at a first high speed serializer/deserializer (SERDES) two-level non-return-to-zero (NRZ) data signals;

converting from the two-level NRZ data signals to multi-level (n) pulse amplitude modulated (PAM) data signals, where n>2;

transmitting the multi-level (n) PAM data signals across a short reach communication channel;

receiving the transmitted multi-level (n) PAM data signals at a second high speed SERDES;

converting from the received multi-level (n) PAM data signals, where n>2, to two-level NRZ data signals; and wherein the transmission of the multi-level (n) PAM data signals reduces a data signaling rate of the short reach communications channel.

18. The method of claim 17, wherein the first and second high speed SERDES each bi-directionally convert signals from the two-level NRZ data signals to the multi-level(n) PAM data signals for transmission and the multi-level(n) PAM data signals to the two-level NRZ data signals upon reception.

19. The method of claim 17, wherein n≥4.

20. The method of claim 17, wherein n≥8 and transmitting/receiving at least eight-level PAM data signals reduces power by at least 50% over using two-level modulated data signaling.

* * * * *